July 13, 1965   B. J. NIGRELLI ETAL   3,194,382
ARTICLE GROUPER AND SPACER
Filed June 24, 1963   3 Sheets-Sheet 3

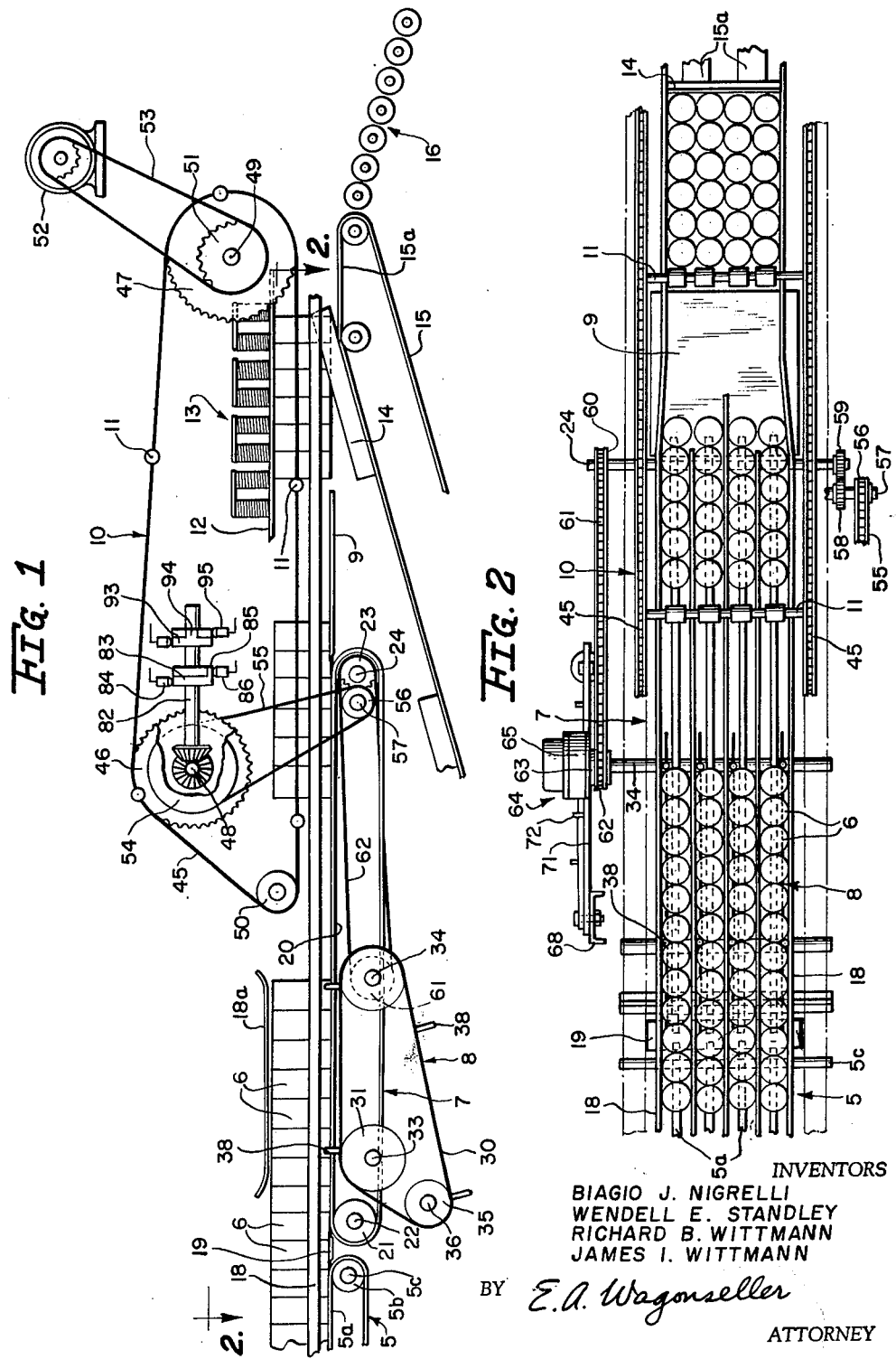

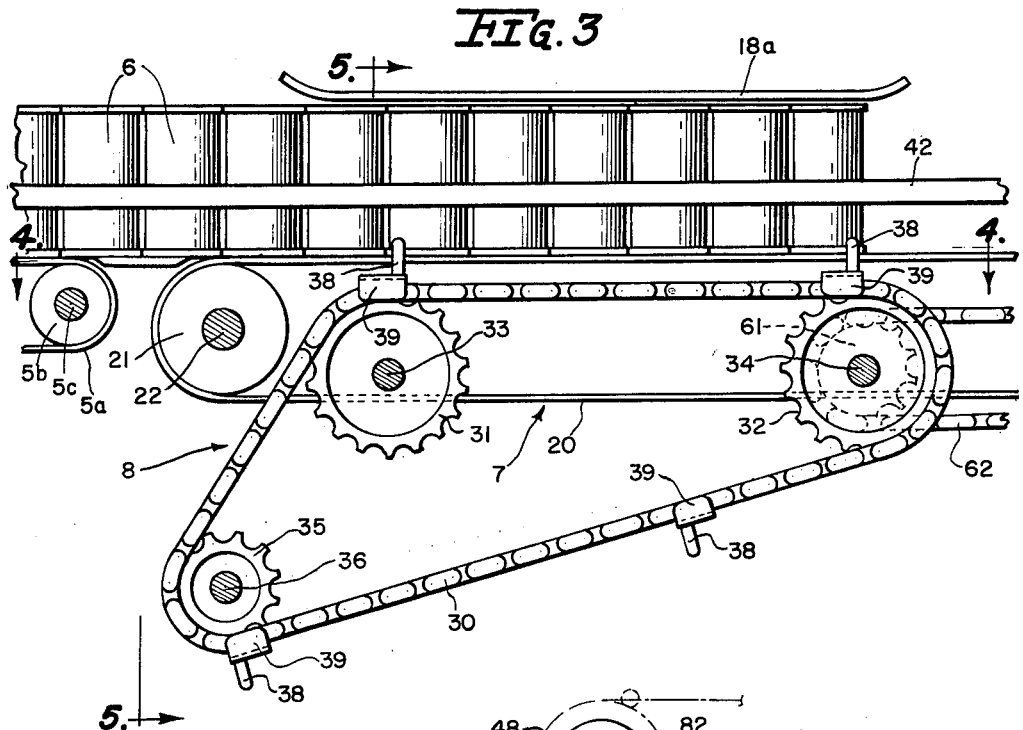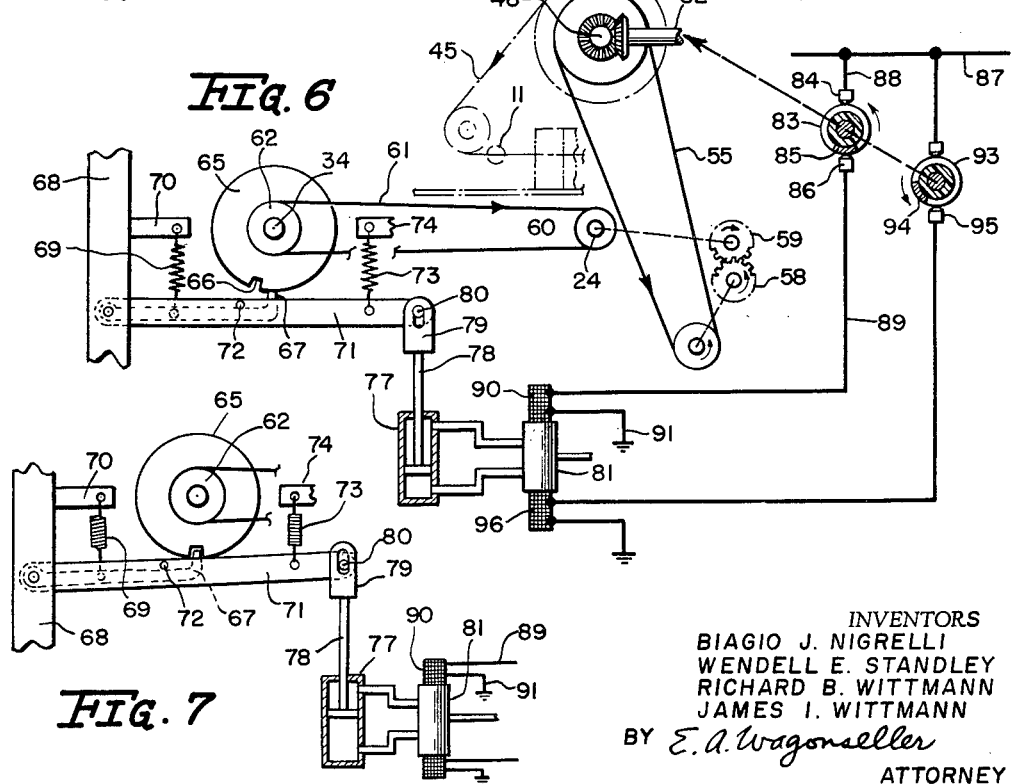

INVENTORS
BIAGIO J. NIGRELLI
WENDELL E. STANDLEY
RICHARD B. WITTMANN
JAMES I. WITTMANN
BY E. A. Wagenseller
ATTORNEY ३,१९४,३८२
ARTICLE GROUPER AND SPACER
Biagio J. Nigrelli, Northbrook, Wendell E. Standley, Lake Forest, and Richard B. Wittmann and James I. Wittmann, Chicago, Ill., assignors to Johns-Nigrelli-Johns, Inc., Skokie, Ill., a corporation of Illinois
Filed June 24, 1963, Ser. No. 289,874
2 Claims. (Cl. 198—34)

The present invention relates to grouping and spacing mechanism and more particularly to mechanism for segregating groups of a predetermined number of articles arranged in an advancing row or rows and causing the individual groups to be spaced from succeeding groups as they are further advanced.

An important object of the invention is to provide a highly efficient form of mechanism capable of segregating groups of upstanding uniform size articles, such as cans, from a row or rows of such articles advancing in abutted relation on conveying means and maintaining the groups of articles separated during their further advance beyond the segregating station.

Another object of the invention is to provide improved mechanism for segregating cylindrical articles from abutted rows in which the articles are being conveyed while resting on their ends with the cylindrical sides disposed upright.

A further object of the invention is to provide improved mechanism for segregating advancing groups of articles such as chimed end cans resting on their ends, such groups being segregated from advancing abutted rows of such articles, and operative to segregate a predetermined number of articles in the row or rows even if the chimes of certain articles are resting upon the chimes of adjacent articles.

A still further object of the invention is to provide group segregating and spacing mechanism particularly designed for handling cylindrical chimed cans advancing in abutted relation in a plurality of adjacent rows on a supply conveyor, first segregating the cans into rectangularly shaped groups of a predetermined number and pattern, spacing the groups and advancing them in spaced relation to a handling station, such as a device for loading the cans substantially en masse into open top containers.

Additional and more specific objects and advantages of the invention will appear as the description proceeds.

In the drawings—

FIGURE 1 is a side elevational, generally schematic, view of the mechanism of the present invention as it appears when associated with mechanism for loading articles into open top trays or containers;

FIGURE 2 is a plan view of the mechanism of FIGURE 1, except that certain portions are omitted in the interest of clarity of illustration;

FIGURE 3 is a fragmentary side elevation, on an enlarged scale, but with certain structure omitted, showing the mechanism at the left end fo FIGURE 1, and illustrating the details of the article segregating device;

FIGURE 6 is detailed schematic view showing the single revolution clutch member in side elevation; and FIGURE 7 is a fragmentary side elevational view showing the single revolution clutch member in locked position.

Figure 4:
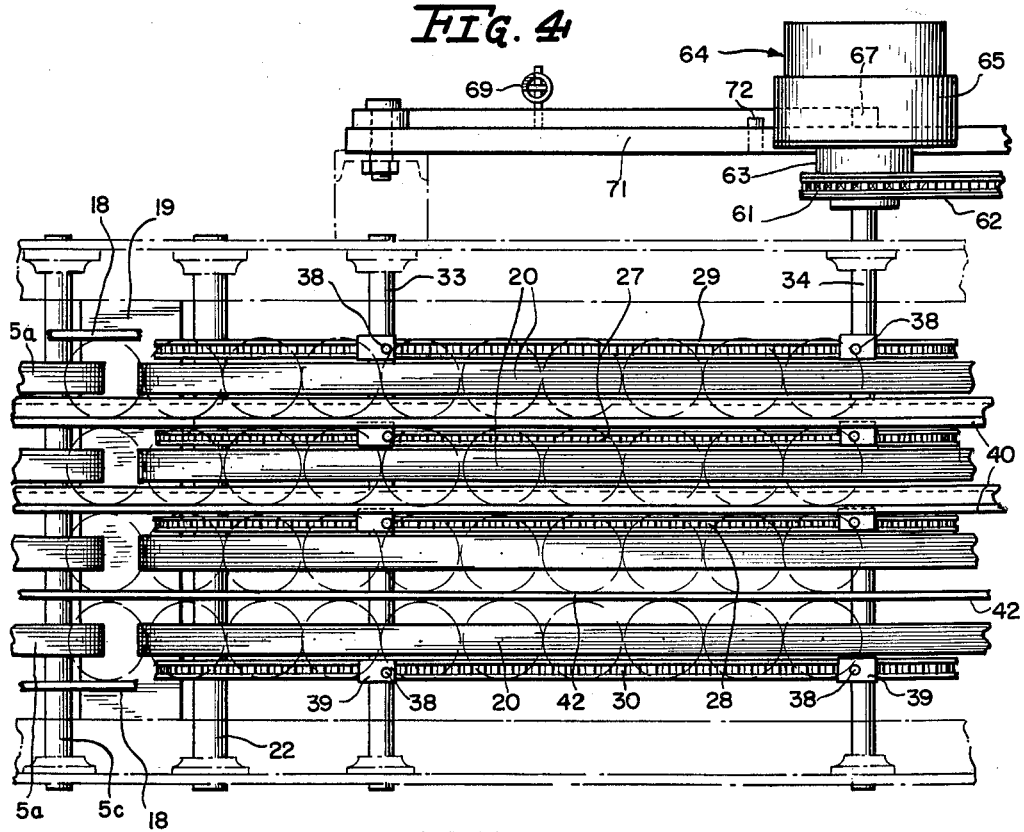
FIGURE 4 is a sectional plan view of the article segregating device taken along line 4—4 of FIGURE 3.

The article grouping and spacing mechanism herein illustrated is designed and adapted particularly for use with a tray or container loading machine, such as illustrated in the patent to B. J. Nigrelli, No. 3,053,025, and with modifications of such machine.

The mechanism herein disclosed is particularly designed to handle loose or unpackaged cans or similar articles, but it may also be employed to handle packages of cans or the like, particularly in the case of packages in which the end cans project partially from the ends of the package.

In the usual operation, a plurality of rows of cylindrical cans are conveyed in upright, abutted relation on a supply or feeding conveyor toward the grouping station. At this station the advancing can rows are controlled by a metering device which includes chains having spaced can-engaging elements thereon. As shown herein, these are pins projecting from the chains.

The invention is not limited for use with articles of cylindrical cross-section. The principles of the mechanism may also be applied to types of articles of non-cylindrical cross-section in which engaging portions on such articles are located rearwardly and forwardly respectively of the foremost and rearmost portions of the article, seen as it is advancing.

The metering chains are driven to allow the rows to advance while they are under the control of the can-engaging pins. These pins move to the point at which a succeeding set of pins has moved to engaging position behind cans which are to become the trailing cans of the predetermined length rows. At this point the metering chains are stopped and held at rest for a brief period. This allows the cans ahead of the leading set of pins to move a distance away from the group that is being held. Following the interval of stoppage, the metering chains are again advanced a distance equal to the spacing between adjacent sets of pins. The leading pins are immediately removed from engagement with the leading cans of the group and the group is released. The next following pins then are in position to control the rows of cans at the rear of the group that has been released. While the can rows are being held back by the pins the surface of the conveyor slips harmlessly beneath the cans.

The metering operation continues with the result that the can groups advance periodically in spaced relation. The spaced groups as they advance may be transferred onto a support, such as a dead plate or guide means, preparatory to the delivery of the cans into a case, or to other treating means.

The separated groups may be advanced to the loading position by an overhead type push-rod conveyor. One of the push rods entering the space at the rear of the separated groups, will then continue to advance the group to bring it to the loading station or to any other desired point.

Referring more particularly to the drawings, a supply or feeding conveyor, indicated generally at 5, is arranged to deliver a plurality of rows of abutted articles 6, 6, such as upright cylindrical cans, to a receiving conveyor, generally indicated at 7. Groups of articles 6 are segregated by a metering device, generally indicated at 8, and such groups are movable onto a suitable support indicated at 9 to be advanced along or beyond such support by conveying means, generally indicated at 10.

While the article grouping means may be employed in connection with various mechanisms, it is herein shown, for purposes of illustration, as employed with a container or tray loading means, such as disclosed in the above mentioned Patent No. 3,053,025. The article grouping means may also conveniently be used in conjunction with loading mechanism of the type disclosed in the copending application of B. J. Nigrelli et al., Serial No. 250.543, now Patent No. 3,141,274.

The conveying means 10, in the form of an overhead conveyor having spaced push rods 11, 11, is designed to engage and advance the segregated groups along the support 9 and into supported relation with suitable slide bars 12 arranged under a series of electromagnets, generally designated at 13. Trays 14, 14, advanced on an inclined, endless conveyor 15, are moved to the loading point and when a group of cans moving on the under surfaces of the magnets engages the leading wall of the tray, the tray is advanced and brought to horizontal position on a conveyor section 15a. As the push rod 11 continues to propel the can group, the cans, having been received into the tray, are propelled beyond the influence of the magnets and the filled tray is discharged onto the roller conveyor 16.

The mechanism is supported on suitable base frame members all of which are conventional. For purposes of illustration the drawings show four lines of cans which are segregated in multiples of six, forming groups of twenty-four cans each which is a convenient number for handling in trays or cases. It is to be understood that the grouping may be varied as desired without departing from the invention.

The conveyor 5, which may be either in the form of an endless belt or a flat plate type of endless chain, has four separate conveying elements 5a, 5a passing over individual rolls 5b, 5b on a shaft 5c. Guide bars 18, 18 are employed to keep the moving cans in the desired alignment and the cans will travel in abutted relation. The two outer guide bars 18 may be extended the entire length of the machine to the loading station. Suitably supported hold-down bars or guides 18a, 18a are preferably employed, arranged in close relation over the tops of the can rows in the area of the metering device.

From conveyor section 5 the rows of cans pass over a dead plate 19 onto conveyor section 7. This section, for convenience, is illustrated as comprising a plurality of narrow belts 20, 20 passing over narrow rolls 21, 21 on shaft 22 at the receiving end of the conveyor. At the discharge end of the conveyor the belts 20 pass over rolls 23, 23 fixed on shaft 24. The shafts 22 and 24 are journalled in suitable bearings carried on the base frame members.

Figure 5:
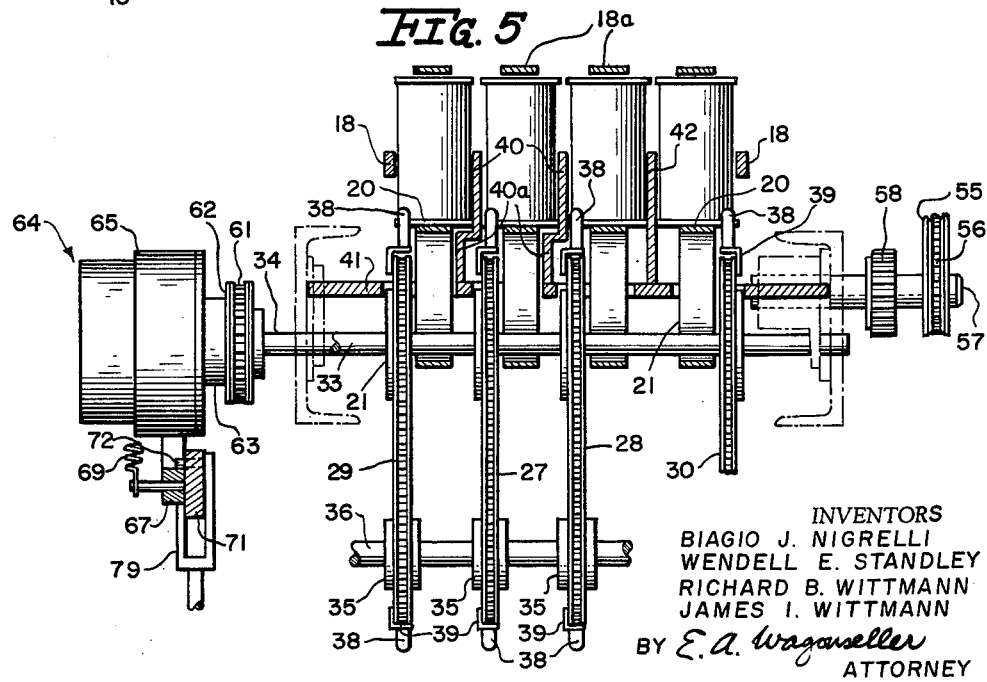
FIGURE 5 is a vertical sectional view, taken along line 5—5 of FIGURE 3, looking in the direction of the arrows.

As best shown in FIGURES 3, 4, and 5, the metering device chains are located in close proximity to the belts 20, 20. The intermediate chains, indicated at 27 and 28, are located between the belts, and the outer two chains, indicated at 29 and 30, are located outside the outer belts. The chains pass over rear and front sprockets 31, 31 and 32, 32 carried on shafts 33 and 34 journalled in suitable bearings on the frame members. In addition to sprockets 31 and 32, the chains pass around chain-tightener sprockets 35, 35 carried on shaft 36.

The metering chains each carry a plurality of uniformly spaced article-engaging elements, herein illustrated as pins 38, 38. These pins may be formed integrally with special chain link elements 39, 39. The construction is such that each pin projects at substantially a right angle to the long axis of its link. The pins extend sufficiently from their chains so that they may contact laterally against the upright surfaces of the cans. As shown in FIGURES 4 and 5, the pins preferably engage against the curved surfaces of the cans at positions offset from lines drawn through the centers of the can rows.

The intermediate guides for the can rows are best illustrated in FIGURE 5. Two of the guides 40, 40 have lower offset portions 40a, 40a secured to an apertured plate 41 having its edges secured to base frame members. The apertures in the plate are formed to accommodate the upper portions of the sprockets. The offset portions 40a afford clearance for the special link elements to which the fingers 38 are secured. The remaining intermediate guide 42 comprises a flat upstanding bar secured to the plate 41.

The intermediate guides 40, 40 and 42 together with the two outer guides 18, 18 serve to keep the cans in each row in accurate alignment. The intermediate guides may be terminated approximately at the ends of the conveyor belts 20, 20 and at this point the outer guide bars 18, 18 may be bent to converge slightly over the dead plate 9 to bring the rows into close lateral engagement preparatory to the loading of the can group into a tray or container.

By reference to FIGURE 4 it may be readily seen that the spacing between the successive pins 38 is less than six can diameters. Thus, when the row of six cans is disposed between the pins with the leading can in firm contact against the leading pin, the trailing pin will be in approximate contact with the trailing can. This assumes that all six cans in the row will be resting flat on the conveyor belt 20. If, as it sometimes happens, the chime of one or more cans is overlapped with the chime on one or more adjoining cans, the trailing pin will be somewhat spaced from its normal point of contact with the trailing can.

By constructing the metering device so that its chain pins will contact the cans off-center, and spacing the pins apart less than six can diameters, as illustrated, it is assured that the trailing pin will not move up beneath the seventh can even though all of the chimes of the six can row are overlapped.

The metering chains may be driven at the same speed at which conveyors 5 and 7 are driven but, preferably, the chains are driven at a speed which is somewhat slower than the speed of conveyors 5 and 7, and means are provided for starting and stopping the metering device in timed relation with the movement of the push rods 11, 11. By holding the metering device at rest at proper intervals, spaces are provided between released can groups and the cans that are being held by the metering device, so that the push rods may successively enter into the spaces in order that they may be in position to propel released groups to the loading station.

The drive for the various conveyors will first be described. Referring to the push rod conveyor 10, this comprises chains 45 passing around main sprockets 46 and 47 carried on shafts 48 and 49 respectively. The chains also pass around idle sprockets 50. The shaft 49 has a sprocket 51 fixed thereon which is driven by a motor 52 through chain 53.

A sprocket 54 is fixed on the shaft 48 and passing over this sprocket is a chain 55 which passes around a sprocket 56 on stub shaft 57. The shaft 24 carrying conveyor roll 23 is driven from the shaft 57 by means of a pair of intermeshing gears 58 and 59 fixed respectively on these shafts. See FIGURES 2 and 5. At the opposite end of shaft 24 from the gear 59, there is fixed a sprocket 60 having a chain 61 passing thereover to drive a sprocket 62 fixed on a hub element 63 which is free to rotate on shaft 34. The hub 63 comprises one element of a single-revolution clutch indicated as a whole at 64.

The details of the single revolution clutch may be varied. Essentially, the clutch member has two functions, which are to drive the metering chains 30 intermittently a distance equal to the spacing between the can engaging pins, and to stop the metering chains each time in the same position and hold them firmly until the time for restarting. For purposes of description the clutch parts may be considered to be operated by frictional engagement. Means are provided for positively holding the clutch part connected to the shaft 34 inoperative and for quick release of such clutch part. For this purpose the rotary member 65 is fixed on the shaft 34 and is formed with a notch 66 on its periphery into which a detent 67 may be received. This detent is pivotally mounted on a frame element 68 in position so that the end of the detent may bear on the periphery of member 65 as it rotates and may enter into the notch 66 as soon as the notch is brought into register with the end of the detent. A spring 69, secured to the detent arm at one end and to a bracket 70 at the other end, urges the end of the detent against the surface of the member 65 and causes it to snap into the notch to stop rotation of the member 65.

For the purpose of withdrawing the detent from the notch a bar 71 is employed, having its end pivoted on frame element 68. The bar 71 has a laterally extending pin 72 which bears freely on the top edge of the detent arm and, by swinging bar 71 downward, the detent is moved against the tension of the spring 69 and withdrawn from the notch. A spring 73 is joined at one end to the bar 71 and at the other end to a bracket 74 fixed on the frame, and serves to urge the bar 71 upward, causing it to swing up sufficiently to remove the pin 72 from engagement with the detent which allows the detent to enter the notch as soon as the two are in register.

Means are provided, as illustrated in FIGURES 6 and 7, for withdrawing the detent 67 from the notch 66 to cause the metering device to begin operation and this operation is timed with the travel of the push rods on the push rod conveyor 10. For this purpose a piston and cylinder mechanism 77 is employed having the piston rod 78 connected with the end of the pivoted bar 71 by a lost motion connection. A yoke 79 on the end of the piston rod is formed with slots into which is received a pin 80 fixed in the end of the bar 71. When the piston rod is moved down the pin 72, bearing on the detent arm, will remove the end of the detent from the notch, whereupon the member 65 will begin rotating together with shaft 34 to drive the metering device.

When the piston rod is moved upward the bar 71 will swing up and is then held in its up position by the spring 73. The bar thus moves to a position in which the detent is free to swing up as soon as the notch is brought into register with the end of the detent.

In order to control the piston rod a solenoid valve 81 is provided. This valve may be of the double solenoid type and is controlled by slip ring mechanism as shown in FIGURES 1 and 6. Two slip ring units, one for each coil of the double solenoid valve, are secured on control shaft 82 having a bevel gear meshing with a similar gear on shaft 48. The continuous conducting ring 83 has a brush 84 bearing thereon. Extending from the ring 83 is a conducting segment 85 arranged to pass in contact with brush 86. When this contact is made, current may flow from the line 87, connected to a source of power, through wire 88, through brush 84, contact ring 83, segment 85, brush 86, and wire 89, thence through solenoid coil 90 to the ground connection 91. This energizes the coil 90 to move its spool to a position to permit air under pressure to enter the cylinder above the piston and force the piston rod down to swing down bar 71. This removes the detent from the rotary member 65 and causes actuation of the metering device.

As soon as the member 65 begins to rotate so that the detent is bearing on the cylindrical face of the member, the solenoid valve may be reversed to raise the piston rod. This will be effected by the second slip ring unit having a continuous conducting ring 93 with segment 94 which is fixed on the shaft so that it will move under its brush 95 within a short time elapse after the segment 85 moves out of contact with its brush 86. The lower solenoid coil 96 is then energized through the conducting wires and slip ring unit, as illustrated, causing air under pressure to enter below the piston and move the piston rod and yoke 79 to its raised position, as shown in FIGURE 7.

The pin 72 on the bar 71, then being brought to the position shown in FIGURE 6, will permit the end of detent 67 to enter the notch 66 as soon as the member 65 has completed one revolution and the notch comes into registration with the detent.

The sprocket ratios are preferably such that conveyors 7 and 10 travel at substantially the same speed and the metering chains travel somewhat slower than the conveyors.

To review the operation—the cans are delivered in a plurality of rows to conveyor 7 by feeding conveyor 5. This latter conveyor may be a part of the ordinary equipment of the packing plant. As the rows of cans reach the receiving conveyor 7 they encounter the pins on the metering device. When these pins are being held stationary, the conveyor belts or plates slip harmlessly beneath the cans while urging them forward.

As soon as the metering device is started, the rows of cans advance behind the can-engaging pins. Just prior to the point where the metering device is brought to a stop, a set of pins moves up into position behind the last can in the rows of a predetermined number. In the present instance, the pins move up into can-engaging position behind the sixth can of each row. As both the leading and trailing pins, as best seen in FIGURES 1 and 3, are disposed in position offset from the center lines of the longitudinal rows and are in close relation to the cans, it will be clear that six cans in each row are under the control of leading and trailing pins that are spaced apart less than six can diameters.

As soon as the metering device is started, the leading pins immediately start to move forward and downward around sprockets 32, 32 and thus no longer restrain the cans. The entire group of four rows of six cans each moves forward on conveyor belts 20, and the group immediately begins to separate from the main body of advancing cans due to the differential speed of the conveyor and the metering chains. The cans in the oncoming rows overtake the pins which were designated as trailing pins and the leading cans in the main body of advancing cans move up against these pins, which may now be considered as leading pins, and remain in contact until the metering chains are again stopped. A new set of trailing pins has now moved up in can engaging position, with each pin in close relation to the vertical can wall.

In the event that some of the chimes in the row of six cans have become overlapped there will be slightly more space between the trailing pin (for that row of cans) and the trailing can. However, due to the spacing of the pins as described, there will be no tendency for the trailing pins to move up and engage the bottom wall of the next can which, if it could occur, would cause the chime of the can so engaged to remain hooked on the upper end of the pin.

As the released group of cans advances farther and a larger space is created one of the push rods on the conveyor 10 will move down into such space ready to propel the group. In the normal operation of the mechanism disclosed, the group of twenty-four cans will advance somewhat ahead of the push rod until the leading portion of the group has been pushed onto the dead plate 9. The group will then come to a stop for a brief interval until the oncoming push rod reaches the trailing end of the group and begins to propel it to the loading point.

While the present description sets forth a preferred form of the invention, numerous changes may be made in the mechanism as disclosed without departing from the spirit of the invention, and it is therefore desired that the present disclosure be considered in all respects as illustrative and not restrictive, reference being had to the appended claims rather than to the foregoing description to indicate the scope of the invention.

We claim:

1. A machine for metering a predetermined number of uniform size, upright chimed articles of generally cylindrical form, such as chimed cans, to constitute a segregated group, such machine comprising a narrow, endless belt conveyor upon which a row of abutted, successively related, chimed articles may be conveyed with provision for the belt to slip beneath the articles, means for continuously driving the belt, said belt being narrower than the diameter of the articles, whereby the articles will project outwardly of the belt at least along one side thereof, guide means for the articles disposed along the opposite side of the belt, a metering device comprising an endless member arranged to operate on the side of the belt opposite the guide means, said metering device having a plurality of equi-spaced, article-engaging elements carried on said endless member below the level of the article supporting belt and having free end portions projecting upward into the path of the articles so that certain of the articles in the conveyed row may be engaged by said elements, the spacing of said elements being less than the overall length of the article group to be segregated, whereby the leading element is adapted to engage a portion of the leading article of a group at a point located rearwardly of such article's foremost surface, and whereby the trailing element is adapted to travel in close juxtaposition to a portion of the trailing article located forwardly of such article's rearmost surface to avoid having such trailing element engage the leading article in a succeeding article group even though certain chimes of the articles in the group to be segregated may be resting one upon the other, and means for operating the metering device intermittently to effect spacing between successive article groups on the supporting conveyor belt.

2. A machine for metering a predetermined number of uniform size, upright, chimed articles of generally cylindrical form, such as chimed cans, to constitute a segregated group comprising uniform length rows, such machine comprising a plurality of endless supporting belts upon each of which a row of abutted, successively related, chimed articles may be conveyed with provision for the individual belts to slip beneath the rows on which the articles are supported, means for continuously driving the belts in synchronism, each belt being narrower than the diameter of the articles, whereby the articles will project outwardly of the belt at least along one side thereof, a metering device for each row of articles, said metering devices each comprising an endless member arranged respectively to operate on the sides of the belts over which the articles project, said metering devices each having a plurality of equi-spaced and uniformly positioned, article-engaging elements carried on said endless members below the level of the article supporting belts and having free end portions projecting upward into the path of the articles to contact beyond the edges of their belts so that certain of the articles in each of the conveyed rows may be engaged by said elements, the spacing of the elements being uniform and less than the overall length of the respective article rows to be segregated, whereby the leading element of each of the metering devices is adapted to engage respectively a portion of the leading article of a row at a point located rearwardly of such article's foremost surface, and whereby the trailing element of each of the metering devices is adapted respectively to travel in close juxtaposition to a portion of the trailing article of the individual rows located forwardly of such article's rearmost surface to avoid having such trailing element of the individual metering device engage the leading article in a succeeding article row even though certain chimes of the articles in one or more of the rows being segregated may be resting one upon the other, and means for uniformly operating the metering devices intermittently to effect spacing between successive article groups of rows on the supporting conveyor belts.

References Cited by the Examiner
UNITED STATES PATENTS 2,497,655  2/50  Bramson _____ 198—135 X
3,053,025  9/62  Nigrelli et al. _____ 198—34 X SAMUEL F. COLEMAN, *Primary Examiner.*

ERNEST A. FALLER, *Examiner.*